US011623374B2

(12) United States Patent
Tajiri

(10) Patent No.: US 11,623,374 B2
(45) Date of Patent: Apr. 11, 2023

(54) RESIN IMPREGNATION MEASUREMENT DEVICE

(71) Applicant: SUBARU CORPORATION, Tokyo (JP)

(72) Inventor: Keisuke Tajiri, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 201 days.

(21) Appl. No.: 16/718,406

(22) Filed: Dec. 18, 2019

(65) Prior Publication Data

US 2020/0207037 A1 Jul. 2, 2020

(30) Foreign Application Priority Data

Dec. 28, 2018 (JP) ............................. JP2018-246725

(51) Int. Cl.
*B29C 70/54* (2006.01)
*G01F 23/263* (2022.01)
*B29C 43/58* (2006.01)
*B29C 70/48* (2006.01)

(52) U.S. Cl.
CPC ............. *B29C 43/58* (2013.01); *B29C 70/48* (2013.01); *G01F 23/263* (2013.01); *G01F 23/266* (2013.01)

(58) Field of Classification Search
CPC ....... B29C 70/54; G01N 27/60; G01F 23/263; G01F 23/268
USPC .................................................. 425/169, 170
See application file for complete search history.

(56) References Cited

U.S. PATENT DOCUMENTS

| 2,435,866 | A | * | 2/1948 | Bilhuber | ................ | B27D 1/083 |
| | | | | | | 156/380.8 |
| 4,044,600 | A | * | 8/1977 | Claxton | .............. | B29C 35/0288 |
| | | | | | | 374/53 |
| 4,486,996 | A | * | 12/1984 | Alejos | ..................... | B29C 33/12 |
| | | | | | | 249/45 |
| 5,453,291 | A | * | 9/1995 | Sasahara | ............... | B29C 70/885 |
| | | | | | | 324/237 |
| 5,770,155 | A | * | 6/1998 | Dunphy | .................. | B29C 70/54 |
| | | | | | | 422/82.05 |
| 7,861,969 | B2 | * | 1/2011 | Guzman | ................. | B29C 43/10 |
| | | | | | | 244/120 |

(Continued)

FOREIGN PATENT DOCUMENTS

EP     1 415 782 A1    5/2004
JP     2013-075471 A   4/2013

OTHER PUBLICATIONS

Murata et al., "Three-dimensional reconstruction of resin flow using capacitance sensor data assimilation during a liquid composite molding process: a numerical study," Composites: Part A, 73, pp. 1-10 (Year: 2015).*

(Continued)

*Primary Examiner* — Andrew D Graham
(74) *Attorney, Agent, or Firm* — Troutman Pepper Hamilton Sanders LLP

(57) ABSTRACT

A resin impregnation measurement device includes a jig and a resin impregnation sensor. The jig is formed into an inner surface shape of a protrusion of a stringer. The jig includes outer surfaces including a facing surface that is to face an inner surface of the protrusion. The resin impregnation sensor is disposed on the facing surface of the jig.

11 Claims, 3 Drawing Sheets

(56) References Cited

U.S. PATENT DOCUMENTS

| | | | | |
|---|---|---|---|---|
| 7,879,276 B2* | 2/2011 | Guzman | ............... | B29C 44/583 |
| | | | | 264/248 |
| 9,056,413 B1* | 6/2015 | Cox | ........................ | B29C 35/02 |
| 2002/0046596 A1* | 4/2002 | Zhang | ................. | G01N 15/0826 |
| | | | | 73/38 |
| 2004/0130072 A1* | 7/2004 | Sekido | .................... | B29C 70/48 |
| | | | | 264/40.1 |
| 2007/0227646 A1* | 10/2007 | Yano | ........................ | B29C 70/50 |
| | | | | 156/180 |
| 2008/0070333 A1* | 3/2008 | Morita | .................... | B29C 33/68 |
| | | | | 438/26 |
| 2008/0211145 A1* | 9/2008 | Graham | ................ | B29C 33/405 |
| | | | | 264/570 |
| 2009/0243128 A1* | 10/2009 | Nelson | ................. | B29C 70/544 |
| | | | | 264/40.1 |
| 2010/0044899 A1* | 2/2010 | Glazebrook | ............ | B29C 70/54 |
| | | | | 264/40.5 |
| 2010/0196637 A1* | 8/2010 | Lippert | ................ | B29C 70/545 |
| | | | | 428/36.1 |
| 2011/0027526 A1* | 2/2011 | McCarville | ............. | B29C 70/30 |
| | | | | 428/116 |
| 2011/0114791 A1* | 5/2011 | Henry | ....................... | B64C 3/38 |
| | | | | 244/123.6 |
| 2012/0222800 A1* | 9/2012 | Reinhardt | ............ | B29D 99/001 |
| | | | | 156/182 |
| 2012/0256348 A1* | 10/2012 | Bergmann | ............... | B29C 43/58 |
| | | | | 264/316 |
| 2012/0330453 A1* | 12/2012 | Samak Sangari | ...... | B25J 13/085 |
| | | | | 700/121 |
| 2014/0262011 A1* | 9/2014 | Lewit | ................... | B29B 15/127 |
| | | | | 156/280 |
| 2014/0290840 A1* | 10/2014 | Bardenhagen | ..... | B29D 99/0014 |
| | | | | 156/245 |
| 2014/0300021 A1* | 10/2014 | Bardenhagen | ........ | B29C 51/303 |
| | | | | 264/101 |
| 2015/0239209 A1* | 8/2015 | Newton | ................ | B29C 70/543 |
| | | | | 428/113 |
| 2016/0189986 A1* | 6/2016 | Kasai | ..................... | B29C 43/18 |
| | | | | 438/127 |
| 2016/0263784 A1* | 9/2016 | Itou | ........................ | B29C 43/12 |
| 2017/0129207 A1* | 5/2017 | Hallander | ............. | B82Y 30/00 |
| 2017/0136661 A1* | 5/2017 | Shome | ................ | B29C 35/0288 |
| 2017/0276648 A1* | 9/2017 | Takahashi | ............... | B29C 70/42 |
| 2018/0079154 A1* | 3/2018 | Moricet | .................. | B29C 70/44 |
| 2018/0370163 A1* | 12/2018 | Belisle | ................. | B29D 99/0003 |
| 2019/0152169 A1* | 5/2019 | Volpato | ................... | B29C 45/53 |
| 2019/0331627 A1* | 10/2019 | Linde | .................. | G01M 5/0033 |
| 2020/0070444 A1* | 3/2020 | Tajiri | ..................... | B29C 70/44 |

OTHER PUBLICATIONS

Extended European Search Report issued in corresponding European Patent Application No. 19 20 9434 dated May 14, 2020.

* cited by examiner

RESIN IMPREGNATION MEASUREMENT DEVICE

CROSS-REFERENCE TO RELATED APPLICATIONS

The present application claims priority from Japanese Patent Application No. 2018-246725 filed on Dec. 28, 2018, the entire contents of which are hereby incorporated by reference.

BACKGROUND

The disclosure relates to a resin impregnation measurement device.

Composite materials such as carbon fiber reinforced plastics (CFRP) are used in aircrafts. Japanese Unexamined Patent Application Publication (JP-A) No. 2013-75471 discloses manufacturing a composite material by a vacuum assisted resin transfer molding (VaRTM) technique. The VaRTM technique manufactures composite materials by impregnating fiber base materials with resin under a vacuum pressure and thermosetting the resin.

SUMMARY

An aspect of the disclosure provides a resin impregnation measurement device. The device includes a jig and a resin impregnation sensor. The jig formed into an inner surface shape of a protrusion of a stringer. The jig includes outer surfaces including a facing surface that is to face an inner surface of the protrusion. The resin impregnation sensor is disposed on the facing surface of the jig.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

When the fiber base material is not sufficiently impregnated with resin, a part of the molded composite material is not impregnated with resin and may have low rigidity. Therefore, a composite material molding device disclosed in JP-A No. 2013-75471 includes a resin impregnation sensor that measures whether the fiber base material is impregnated with resin.

However, the resin impregnation sensor is provided outside the composite material molding device. Since resin distribution media are usually provided inside the composite material molding device, the resin impregnation sensor has poor measurement accuracy in measuring whether the fiber base material is impregnated with resin.

It is desirable to provide a resin impregnation measurement device capable of improving measurement accuracy in measuring whether a fiber base material is impregnated with resin.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
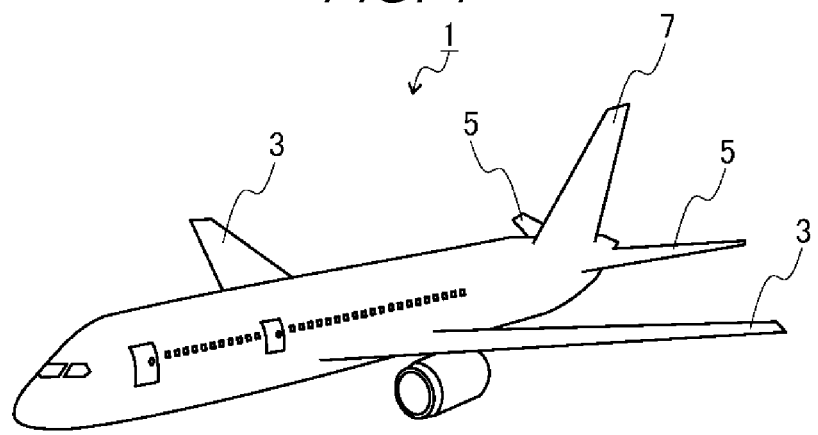
FIG. 1 is a schematic perspective view of an aircraft.
Figure 2:
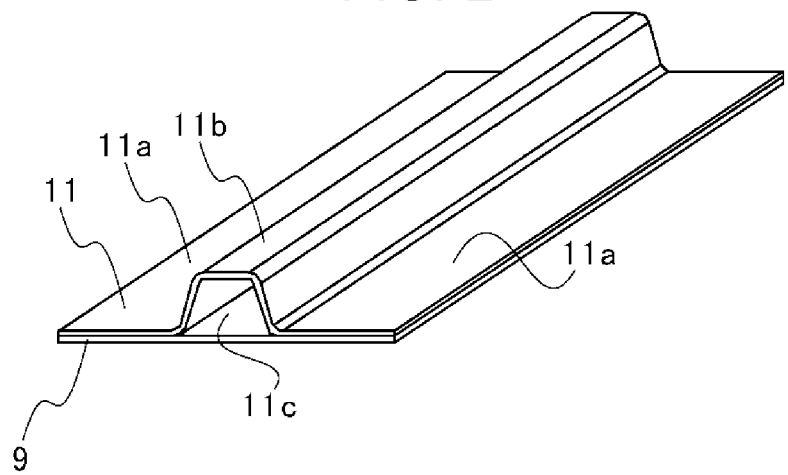
FIG. 2 is a perspective view illustrating a cross section of a part of a wing of the aircraft.

FIG. 1 is a schematic perspective view of an aircraft 1. As illustrated in FIG. 1, the aircraft 1 includes main wings 3, horizontal stabilizers 5, and a vertical stabilizer 7. Hereinafter, the main wings 3, the horizontal stabilizers 5, and the vertical stabilizer 7 may be simply referred to as wings. FIG. 2 is a perspective view illustrating a cross section of a part of the wings of the aircraft 1. As illustrated in FIG. 2, the wings of the aircraft 1 include a skin 9 and a stringer 11.

The skin 9 is an outer shell of the wings of the aircraft 1. The skin 9 has, for example, a flat plate shape. The stringer 11 is used as a reinforced material that reinforces the skin 9, and is attached to the skin 9. The stringer 11 includes coupling portions 11a coupled to the skin 9 and a protrusion 11b that protrudes away from the skin 9. The coupling portions 11a are closer to the skin 9 than the protrusion 11b. The protrusion 11b is farther from the skin 9 than the coupling portions 11a.

A hollow portion 11c is formed between the protrusion 11b and the skin 9. Examples of the stringer 11 include a hat stringer having a hat shape and a corrugated stringer having a corrugated shape. FIG. 2 illustrates an example in which the stringer 11 is the hat stringer. The stringer 11 is not limited thereto. Alternatively, the stringer 11 may be the corrugated stringer. Here, the corrugated stringer is shaped such that hat stringers shown in FIG. 2 are continuously arranged in the left and right directions in FIG. 2. The skin 9 and the stringer 11 are formed of a composite material such as glass fiber reinforced plastics (GFRP) or carbon fiber reinforced plastics (CFRP). The composite materials (for example, the skin 9 and the stringer 11) are molded by a composite material molding device 100 which will be described below.

Figure 3:
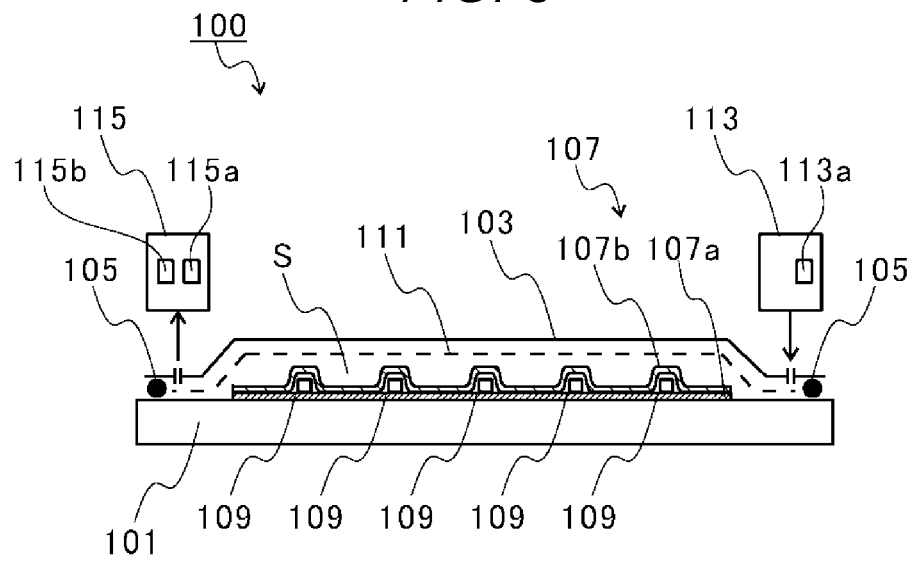
FIG. 3 is a view illustrating a composite material molding device according to an embodiment of the disclosure.

FIG. 3 is a view illustrating the composite material molding device 100 according to the embodiment. The composite material molding device 100 manufactures the composite materials by the VaRTM technique. As illustrated in FIG. 3, the composite material molding device 100 includes a molding die 101, a film material 103, seal materials 105, a fiber base material 107, jigs (cores) 109, resin distribution media 111, a resin supply unit 113, and a resin discharge unit 115.

A space S is formed between the molding die 101 and the film material 103. The space S is sealed by the seal materials 105 disposed between the molding die 101 and the film material 103. The fiber base material 107, the jigs 109, and the resin distribution media 111 are disposed in the space S.

The fiber base material 107 is placed on the molding die 101. The fiber base material 107 is formed by stacking fiber materials such as glass fibers or carbon fibers. The fiber base material 107 includes a fiber base material 107a corresponding to the skin 9 (hereinafter referred to as a skin fiber base material) and a fiber base material 107b corresponding to the stringer 11 (hereinafter referred to as a stringer fiber base material).

The skin fiber base material 107a has a shape approximate to the shape of the skin 9, and has, for example, a flat plate shape. The stringer fiber base material 107b has a shape approximate to the shape of the stringer 11, and has, for example, a corrugated shape. The skin fiber base material 107a is placed on the molding die 101, and the stringer fiber base material 107b is placed on the skin fiber base material 107a.

The jigs 109 are disposed between the skin fiber base material 107a and the stringer fiber base material 107b. The jigs 109 have an outer shape approximate to the outer shape of the hollow portion 11c (see FIG. 2) formed between the skin 9 and the protrusion 11b of the stringer 11. The jigs 109 maintain the shape of the protrusion 11b (see FIG. 2) after the stringer 11 is molded. Therefore, the outer shape of each jig 109 is identical with an inner surface shape of the protrusion 11b of the stringer 11. The jigs 109 extend in a depth direction in FIG. 3. The jigs 109 are placed on the skin fiber base material 107a, and the stringer fiber base material 107b is placed on the jigs 109. That is, the jigs 109 are disposed between the skin fiber base material 107a and the stringer fiber base material 107b.

The resin distribution media 111 are placed on the fiber base material 107 (that is, the stringer fiber base material 107b). For example, a polyethylene net is used as the resin distribution media 111. Supplied resin is uniformly distributed in the space S via the resin distribution media 111.

The resin supply unit 113 and the resin discharge unit 115 are coupled to the space S sealed by the seal materials 105. The resin supply unit 113 includes a resin supply tank 113a that stores resin.

The resin supply unit 113 supplies the resin stored in the resin supply tank 113a into the space S.

The resin discharge unit 115 includes a vacuum pump 115a that suctions air and evacuates the space S, and a resin discharge tank 115b that stores the resin. The vacuum pump 115a suctions the air and resin in the space S. The resin (that is, surplus resin) suctioned from the space S is discharged to the resin discharge tank 115b.

In the embodiment, the resin is thermosetting resin. The disclosure is not limited thereto. For example, the resin may be thermoplastic resin. When the resin is supplied into the space S, the resin flows from the resin supply unit 113 side (right side in FIG. 3) toward the resin discharge unit 115 side (left side in FIG. 3). The plurality of jigs 109 are disposed along a flowing direction of the resin (hereinafter, referred to as a resin flowing direction). A longitudinal direction (that is, an extending direction) of the jigs 109 intersects the resin flowing direction. The longitudinal direction of the jigs 109 may be orthogonal to the resin flowing direction. The disclosure is not limited thereto. Alternatively, the longitudinal direction of the jigs 109 may be parallel to the resin flowing direction.

Next, a method for molding the composite materials using the composite material molding device 100 will be described. First, a user places the skin fiber base material 107a on the molding die 101, and places the jigs 109 on the skin fiber base material 107a. Further, the user places the stringer fiber base material 107b on the jigs 109, and places the resin distribution media 111 on the stringer fiber base material 107b.

Next, the user covers the resin distribution media 111 with the film material 103, and provides the sealing materials 105 between the film material 103 and the molding die 101 so as to enclose the resin distribution media 111 and the fiber base material 107. Accordingly, the sealed space S is formed between the film material 103 and the molding die 101, and the resin distribution media 111, the fiber base material 107, and the jigs 109 are accommodated in the space S.

Thereafter, the user couples the resin supply unit 113 and the resin discharge unit 115 to the space S.

When the resin supply unit 113 and the resin discharge unit 115 are coupled to the space S, the resin discharge unit 115 drives the vacuum pump 115a. The vacuum pump 115a suctions air in the space S to evacuate the space S. When the space S is in the vacuum state, the resin stored in the resin supply tank 113a is supplied into the space S.

The resin supplied into the space S is distributed via the resin distribution media 111 throughout the fiber base material 107. The resin distributed via the resin distribution media 111 is first introduced onto the stringer fiber base material 107b. The stringer fiber base material 107b is impregnated with the resin distributed via the resin distribution media 111.

When the stringer fiber base material 107b is impregnated with the resin, the resin is introduced onto the skin fiber base material 107a. The skin fiber base material 107a is impregnated with the resin that passes through the stringer fiber base material 107b. A surplus of the resin that impregnates the skin fiber base material 107a and the stringer fiber base material 107b is discharged into the resin discharge tank 115b of the resin discharge unit 115.

When the fiber base material 107 (including the skin fiber base material 107a and the stringer fiber base material 107b) is impregnated with the resin, the composite material molding device 100 is heated by a heating device (not illustrated). The resin is cured when heated by the heating device (not illustrated). The composite materials (the skin 9 and the stringer 11) are integrally molded by curing the resin. That is, the molded composite materials (the skin 9 and the stringer 11) are permanently affixed to each other. During the resin curing process, the jigs 109 form the protrusion 11b of the stringer 11.

After the composite materials are molded, the jigs 109 are pulled out from between the skin 9 and the stringer 11. Accordingly, as illustrated in FIG. 2, the hollow portion 11c is formed between the skin 9 and the protrusion 11b of the stringer 11.

In this way, the skin 9 and the stringer 11 are formed by impregnating the fiber base material 107 with the resin. If the fiber base material 107 is not sufficiently impregnated with the resin, a part of the molded composite materials may have low rigidity. Therefore, a resin impregnation sensor is provided in the composite material molding device 100. The resin impregnation sensor measures whether the fiber base material 107 is impregnated with the resin.

In a related art, a resin impregnation sensor is provided outside the composite material molding device 100. The stringer fiber base material 107b is impregnated with the resin from a resin distribution media 111 side towards the jigs 109. Therefore, it is difficult for the resin impregnation sensor of the related art to measure whether the fiber base material 107 is sufficiently impregnated up to the boundary between the stringer fiber base material 107b and the jigs 109 with the resin. That is, the resin impregnation sensor of the related art has poor measurement accuracy in measuring whether the fiber base material 107 is impregnated with the resin.

Figure 4:
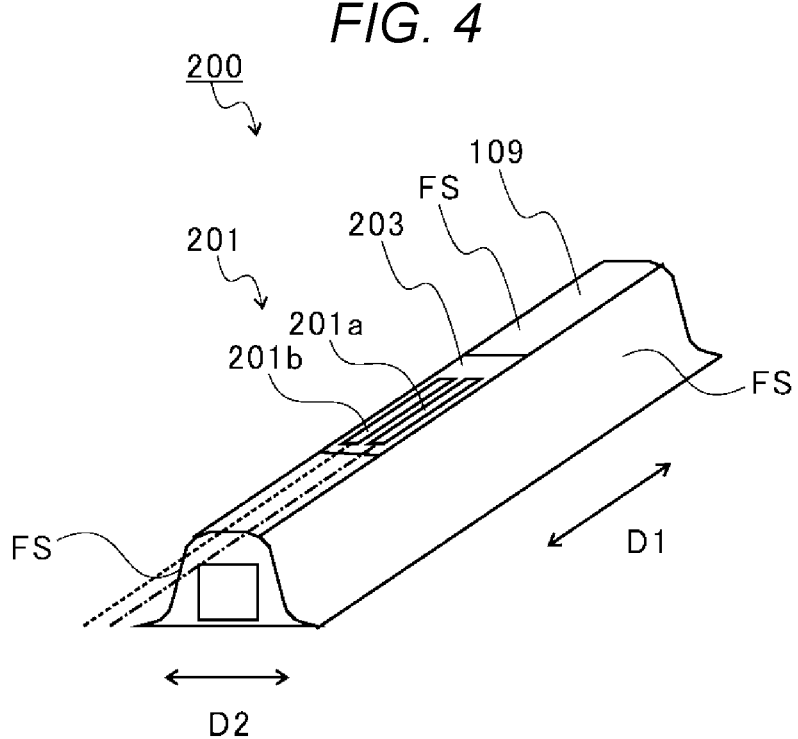
FIG. 4 is a schematic perspective view of a resin impregnation measurement device.

Then, the resin impregnation sensor is provided on the jigs 109 in the embodiment. Hereinafter, the jig 109 provided with the resin impregnation sensor will be referred to as a resin impregnation measurement device 200. FIG. 4 is a schematic perspective view of the resin impregnation measurement device 200. As illustrated in FIG. 4, the resin impregnation measurement device 200 includes the jig 109, a resin impregnation sensor 201, and a mold release member 203. The mold release member 203 includes, for example, an insulator.

The jig 109 includes outer surfaces including facing surfaces FS that are to face the stringer fiber base material 107b (see FIG. 3). The resin impregnation sensor 201 is disposed on any of the facing surface FS. For example, the jig 109 includes outer surfaces including facing surfaces FS that are to face inner surfaces of the protrusion 11b (see FIG. 2) of the stringer 11. The resin impregnation sensor 201 is disposed on any of the facing surfaces FS.

The resin impregnation sensor 201 includes a positive electrode 201a and a negative electrode 201b. In FIG. 4, a chain line indicates a power supply line that supplies power to the positive electrode 201a, and a broken line indicates a power supply line that supplies power to the negative electrode 201b. The positive electrode 201a and the negative electrode 201b are separated from each other and are disposed in parallel. The positive electrode 201a and the negative electrode 201b extend in a longitudinal direction D1 of the jig 109 (that is, a direction intersecting the resin flowing direction). Alternatively, the positive electrode 201a and the negative electrode 201b may extend in a short direction D2 of the jig 109 (that is, a direction parallel to the resin flowing direction). In the embodiment, the positive electrode 201a is disposed on the right side in FIG. 4 and the negative electrode 201b is disposed on the left side in FIG. 4. The disclosure is not limited to this example. Alternatively, the positive electrode 201a may be disposed on the left side in FIG. 4, and the negative electrode 201b may be disposed on the right side in FIG. 4.

The resin impregnation sensor 201 includes a facing surface that faces the jig 109. The facing surface of the resin impregnation sensor 201 is a contact surface of the resin impregnation sensor 201 that is in contact with the jig 109. The mold release member 203 is disposed on an opposite side to the facing surface of the resin impregnation sensor 201. The mold release member 203 covers the positive electrode 201a and the negative electrode 201b. The mold release member 203 prevents the resin from coming into contact with the positive electrode 201a and the negative electrode 201b. Therefore, the positive electrode 201a and the negative electrode 201b are less likely to be caught in the protrusion 11b of the stringer 11 after the composite material is molded. As a result, the resin impregnation measurement device 200 allows easily removing (pulling out) the positive electrode 201a and the negative electrode 201b from the molded composite materials, together with the jigs 109.

Figure 5:
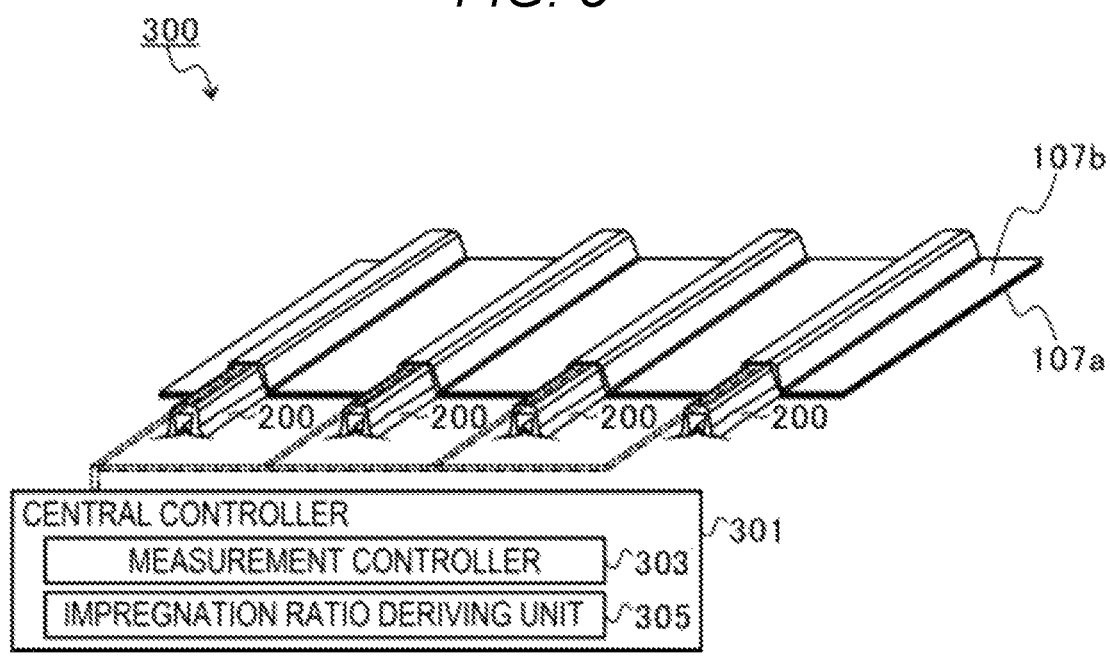
FIG. 5 is a view illustrating a schematic configuration of the resin impregnation measurement system.

FIG. 5 is a view illustrating a schematic configuration of a resin impregnation measurement system 300. As illustrated in FIG. 5, the resin impregnation measurement system 300 includes a plurality of resin impregnation measurement devices 200 and a central controller 301.

The central controller 301 is implemented by a semiconductor integrated circuit that includes a central processing unit (CPU), a ROM storing programs, a RAM serving as a working area. The central controller 301 manages and controls the entire resin impregnation measurement system 300. The central controller 301 also functions as a measurement controller 303 and an impregnation ratio deriving unit 305, in cooperation with the programs.

The measurement controller 303 measures an electrostatic capacity between the positive electrode 201a and the negative electrode 201b (see FIG. 4) in each of the resin impregnation measurement devices 200. The measurement controller 303 applies a positive voltage to the positive electrode 201a and applies a negative voltage to the negative electrode 201b. A potential difference V between the voltage of the positive electrode 201a and the voltage of the negative electrode 201b is, for example, 5V. At this time, when the resin is filled between the positive electrode 201a and the negative electrode 201b, a dielectric constant between the positive electrode 201a and the negative electrode 201b changes as compared to a state in which no resin is filled. When the dielectric constant changes, a value of the electrostatic capacity measured by the measurement controller 303 changes.

For example, when no resin is filled between the positive electrode 201a and the negative electrode 201b (an unfilled state, that is, a filling ratio is 0%), the measurement controller 303 obtains an electrostatic capacity value $C_O$ based on the dielectric constant $\varepsilon 0$ of vacuum as a measurement result. When the resin is filled between the positive electrode 201a and the negative electrode 201b (that is, the filling ratio is 100%), the measurement controller 303 obtains an electrostatic capacity value $C_S$ based on the dielectric constant $\varepsilon S$ of the resin as a measurement result. While the space between the positive electrode 201a and the negative electrode 201b is changing from the unfilled state to a filled state, the measurement controller 303 obtains a value between the value $C_O$ and the value $C_S$ according to the resin filling ratio (that is, an impregnation ratio). In general, the electrostatic capacity has a relationship that the value $C_O <$ the value $C_S$. In the embodiment, the electrostatic capacity is measured by applying the positive voltage to the positive electrode 201a and applying the negative voltage to the negative electrode 201b. A method for measuring the electrostatic capacity is not limited thereto. For example, the resin impregnation sensor 201 may include a pair of electrodes, and the electrostatic capacity may be measured by applying an AC voltage to the pair of electrodes.

The impregnation ratio deriving unit 305 derives a resin impregnation ratio in the boundary between the fiber base material 107 (that is, the stringer fiber base material 107b) and the jigs 109 based on the electrostatic capacities measured by the measurement controller 303. The impregnation ratio deriving unit 305 can derive a resin impregnation ratio in the boundary between the fiber base material 107 and the jigs 109 (in a range of 0% to 100%) based on the electrostatic capacities measured by the measurement controller 303. For example, when the electrostatic capacity is the value $C_S$, the impregnation ratio deriving unit 305 can know that the filling in the boundary between the fiber base material 107 and the jigs 109 is finished (that is, the impregnation ratio is 100%).

As described above, the resin impregnation measurement device 200 of the embodiment includes the resin impregnation sensors 201 on the jigs 109. With this configuration, the impregnation ratio deriving unit 305 can derive the impregnation ratio of the resin in the boundary between the stringer fiber base material 107b and the jigs 109. Therefore, the resin impregnation measurement device 200 of the embodiment can measure whether the fiber base material 107 is sufficiently impregnated up to the boundary between the stringer fiber base material 107b and the jigs 109 with the resin. That is, the resin impregnation measurement device 200 can improve measurement accuracy in measuring whether the fiber base material 107 is impregnated with the resin.

Further, the resin impregnation measurement device 200 of the embodiment includes the mold release members 203 that cover the resin impregnation sensors 201, on the jigs 109. This configuration allows keeping the resin impregnation sensors 201 separated from the resin. Therefore, the resin impregnation measurement device 200 of the embodiment allows easily removing the resin impregnation sensors 201 from the composite materials after the composite materials are molded.

If the resin impregnation sensors 201 are left in the composite materials (that is, the skin 9 and the stringer 11), there is room for improvement in that a crack might occur in the skin 9 and the stringer 11. That is, if the resin impregnation sensors 201 are left in the composite materials, there is room for improvement in quality of the composite materials. In the embodiment, the resin impregnation sensors 201 can be easily removed from the composite materials together with the jigs 109. Therefore, the resin impregnation measurement device 200 of the embodiment can prevent cracks from occurring in the composite materials (that is, the skin 9 and the stringer 11). As a result, a deterioration in quality of the composite materials can be prevented.

The embodiment of the disclosure has been described above with reference to the accompanying drawings. It is needless to say that the disclosure is not limited to the present embodiment. It will be apparent to those skilled in the art that various changes and modifications may be made to the embodiment within the scope of the claims. It is to be understood that such changes and modifications also fall within the technical scope of the disclosure.

For example, a program that causes a computer to function as the central controller 301 of the resin impregnation measurement system 300, and a storage medium such as a computer readable flexible disk, a magneto-optical disk, a ROM, a CD, a DVD, or a BD that stores the program are provided. Here, the program refers to a data processing method described in any language or description method.

In the above embodiment, the description has been made on the example in which a single (one) positive electrode 201a and a single (one) negative electrode 201b extend in the longitudinal direction of each jig 109. The disclosure is not limited to this example. Alternatively, plural positive electrodes 201a and plural negative electrodes 201b may extend in the longitudinal direction of each jig 109.

In the above embodiment, the description has been made on the example in which each resin impregnation sensor 201 includes electrodes (that is, the positive electrode 201a and the negative electrode 201b). The disclosure is not limited to this example. Alternatively, each resin impregnation sensor 201 may be implemented by, for example, an optical fiber sensor. For example, instead of the positive electrode 201a and the negative electrode 201b, an optical fiber is attached to each jig 109 in FIG. 4. The measurement controller 303 causes light to enter from an incident end of each optical fiber, and measures Brillouin scattered light that returns to the incident end. When the boundary between the stringer fiber base material 107b and the jigs 109 is filled with the resin, the frequency of the Brillouin scattered light is shifted according to the filling ratio (that is, the impregnation ratio) of the resin. The impregnation ratio deriving unit 305 derives the impregnation ratio of the resin in the boundary between the stringer fiber base material 107b and the jigs 109 based on the frequency shift of the Brillouin scattered light.

In the above embodiment, the description has been made on the example in which each resin impregnation sensor 201 is disposed on any of the facing surface FS of the corresponding jig 109 among the outer surfaces of the jig 109. The disclosure is not limited to this example. Alternatively, each resin impregnation sensor 201 may be disposed, for example, on a facing surface of the corresponding jig 109 that is to face the skin fiber base material 107a (that is, the skin 9) among the outer surfaces of the corresponding jig 109.

Figure 6:
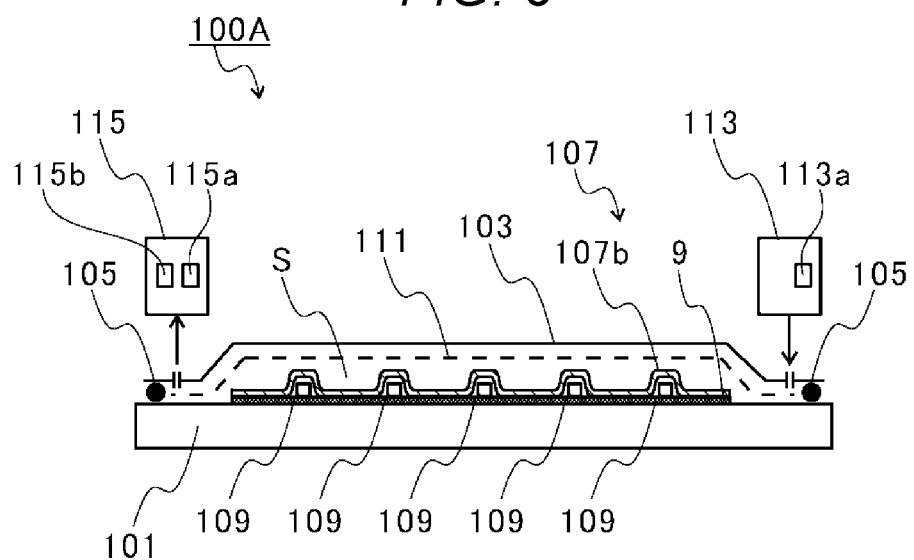
FIG. 6 is a view illustrating a composite material molding device according to a first modification.

In the above embodiment, the description has been made on the example in which the skin 9 and the stringer 11 are integrally molded and permanently affixed to each other. The disclosure is not limited to this example. Alternatively, the stringer 11 may be molded separately from the skin 9. FIG. 6 is a view illustrating a composite material molding device 100A according to a first modification. The composite material molding device 100A of the first modification is the same as the composite material molding device 100 of the above embodiment except that the skin fiber base material 107a is the skin 9.

As illustrated in FIG. 6, the skin 9, the jigs 109, the fiber base material 107 (that is, the stringer fiber base material 107b), and the resin distribution media 111 are accommodated in the space S. The skin 9 is placed on the molding die 101. The jigs 109 and the stringer fiber base material 107b are placed on the skin 9. The resin distribution media 111 is placed on the stringer fiber base material 107b. In this state, when the resin is filled and cured in the space S, a composite material (that is the stringer 11) is molded on the skin 9.

Figure 7:
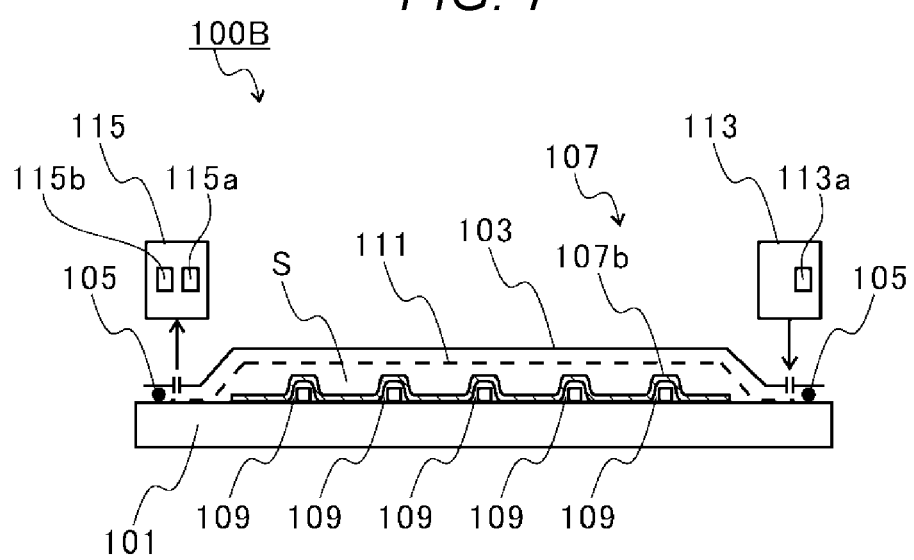
FIG. 7 is a view illustrating a composite material molding device according to a second modification.

FIG. 7 is a view illustrating a composite material molding device 100B according to a second modification. The composite material molding device 100B of the second modification is the same as the composite material molding device 100 of the above embodiment and the composite material molding device 100A of the first modification except that neither the skin fiber base material 107a nor the skin 9 is provided in the space S. As illustrated in FIG. 7, the jigs 109, the fiber base material 107 (that is, the stringer fiber base material 107b), and the resin distribution media 111 are accommodated in the space S. The jigs 109 and the stringer fiber base material 107b are placed on the molding die 101. The resin distribution media 111 is placed on the stringer fiber base material 107b. In this state, when the resin is filled and cured in the space S, a composite material (that is, the stringer 11) is molded on the molding die 101.

According to at least one embodiment of the disclosure, it is possible to improve the measurement accuracy in measuring whether the fiber base material is impregnated with resin.

The invention claimed is:

1. A resin impregnation measurement device comprising:
jigs, each of the jigs being formed into an inner surface shape of a protrusion of a stringer of a composite material, each of the jigs comprising outer surfaces comprising a facing surface that is to face an inner surface of the protrusion, wherein:

the outer surfaces of each of the jigs are approximately identical to the inner surface of the protrusion, the stringer comprises a fiber base material and a resin, and is formed by a method including impregnating the fiber base material with the resin, and the jigs are disposed so that a longitudinal direction of each of the jigs intersects a flow direction of the resin;

resin impregnation sensors, each of the resin impregnation sensors being disposed on the facing surface of a corresponding one of the jigs, wherein each of the resin impregnation sensors is configured to detect at least an electrostatic capacity value indicating whether the fiber base material is impregnated with the resin or not, and each of the resin impregnation sensors includes a positive electrode and a negative electrode which extend along the longitudinal direction of the corresponding one of the jigs, the positive electrode and the negative electrode being disposed in parallel; and mold release members, each of the mold release members comprises a facing surface that faces the corresponding one of the jigs, wherein:

each of the mold release members is disposed on an opposite side to a facing surface of each of the resin impregnation sensors, and each of the mold release members covers the positive electrode and the negative electrode to prevent the resin from coming into contact with the positive electrode and the negative electrode.

2. The resin impregnation measurement system comprising:

the resin impregnation measurement device according to claim 1, and a controller configured to derive an impregnation ratio of the resin in the fiber base material based on the electrostatic capacity value.

3. The resin impregnation measurement device according to claim 1, wherein each of the resin impregnation sensors consists of a pair of a positive electrode and a negative electrode which extend linearly along the longitudinal direction of the corresponding one of the jigs, and the positive electrode and the negative electrode are formed in planer shape.

4. The resin impregnation measurement device according to claim 1, wherein the positive electrode and the negative electrode are configured to be removed, after molding the stringer, from the molded stringer together with the corresponding one of the jigs.

5. The resin impregnation measurement device according to claim 1, wherein the resin impregnation sensors are removable from the composite material and the jigs.

6. The resin impregnation measurement device according to claim 3, wherein the resin impregnation sensors are removable from the composite material and the jigs.

7. The resin impregnation measurement device according to claim 1, wherein the resin impregnation sensors are optical fiber sensors, the optical fiber sensors being attached to each of the jigs.

8. The resin impregnation measurement device according to claim 3, wherein the resin impregnation sensors are optical fiber sensors, the optical fiber sensors being attached to each of the jigs.

9. The resin impregnation measurement device according to claim 1, wherein the stringer is configured to be a part of a wing of an aircraft, and the jigs and the resin impregnation sensors are removable from the composite material.

10. The resin impregnation measurement device according to claim 1, further comprising a controller coupled to the resin impregnation sensors, and configured to measure an electrostatic capacity between the positive electrode and the negative electrode in each of the resin impregnation sensors.

11. The resin impregnation measurement device according to claim 1, further comprising a controller coupled to the resin impregnation sensors, and configured to measure an electrostatic capacity between the positive electrode and the negative electrode in each of the resin impregnation sensors, wherein the stringer is configured to be a part of a wing of an aircraft, and the jigs and the resin impregnation sensors are removable from the composite material.

* * * * *